US007391161B2

(12) United States Patent
Janning

(10) Patent No.: US 7,391,161 B2
(45) Date of Patent: *Jun. 24, 2008

(54) SERIES WIRED LIGHT STRING WITH UNIDIRECTIONAL SHUNTS

(75) Inventor: John L. Janning, Dayton, OH (US)

(73) Assignee: JLJ, Inc., Bellbrook, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/605,405

(22) Filed: Nov. 29, 2006

(65) Prior Publication Data

US 2007/0075646 A1 Apr. 5, 2007

Related U.S. Application Data

(60) Continuation-in-part of application No. 10/954,225, filed on Oct. 1, 2004, now Pat. No. 7,166,968, which is a continuation-in-part of application No. 10/364,525, filed on Feb. 12, 2003, now abandoned, which is a continuation of application No. 10/061,223, filed on Feb. 4, 2002, now Pat. No. 6,580,182, which is a continuation of application No. 09/526,519, filed on Mar. 16, 2000, now abandoned, which is a division of application No. 08/896,278, filed on Jul. 7, 1997, now abandoned, which is a continuation of application No. 08/653,979, filed on May 28, 1996, now abandoned, which is a continuation-in-part of application No. 08/560,472, filed on Nov. 17, 1995, now abandoned, which is a continuation-in-part of application No. 08/494,725, filed on Jun. 26, 1995, now abandoned.

(60) Provisional application No. 60/832,622, filed on Jul. 21, 2006.

(51) Int. Cl.
*H02H 9/00* (2006.01)

(52) U.S. Cl. ........................................ 315/122

(58) Field of Classification Search .............. 315/185 S, 315/312, 209 SC, 47, 74–75, 246, 121–122, 315/125; 362/568, 612, 565, 630, 555, 800
See application file for complete search history.

(56) References Cited

U.S. PATENT DOCUMENTS 1,024,495 A 4/1912 Booth (Continued)

FOREIGN PATENT DOCUMENTS

CH 427021 6/1965

(Continued)

*Primary Examiner*—Douglas W. Owens
*Assistant Examiner*—Minh Dieu A
(74) *Attorney, Agent, or Firm*—Dickenstein Shapiro LLP

(57) ABSTRACT

A series-connected string of light bulbs, operating on AC voltage, each having connected thereacross a voltage regulating shunting circuit which regulates the voltage across an empty or otherwise inoperative socket so as to maintain unidirectional current across each of the remaining sockets in the string during one-half of an AC cycle, thereby insuring continuous but dimmed illumination of the light string. The voltage regulating shunting circuit of the present invention is a silicon rectifier diode connected in series with a voltage regulating diode. The voltage regulating diode may be an array of silicon diodes or a Zener diode. The voltage regulating shunting circuit can be mass produced by using conventional manufacturing techniques.

7 Claims, 2 Drawing Sheets

U.S. PATENT DOCUMENTS

| | | | | |
|---|---|---|---|---|
| 2,072,337 | A | 3/1937 | Kamm | |
| 2,760,120 | A | 8/1956 | Fisherman | |
| 3,639,805 | A | 2/1972 | Muench et al. | |
| 3,912,966 | A | 10/1975 | Hamden, Jr. | |
| 4,450,382 | A | 5/1984 | Sawka et al. | |
| 4,682,079 | A | 7/1987 | Sanders et al. | |
| 4,727,449 | A | 2/1988 | Fleck | |
| 5,006,724 | A | 4/1991 | Liu | |
| RE34,717 | E | 9/1994 | Sanders et al. | |
| 5,379,214 | A | 1/1995 | Arbuckle et al. | |
| 5,539,317 | A | 7/1996 | Janning | |
| 6,580,182 | B2 | 6/2003 | Janning | |
| 6,765,313 | B2 * | 7/2004 | Janning | 307/36 |
| 7,166,968 | B2 * | 1/2007 | Janning | 315/185 R |
| 7,178,961 | B2 * | 2/2007 | Janning | 362/565 |
| 7,545,085 | * | 7/2007 | Villarin | 215/188 |

FOREIGN PATENT DOCUMENTS

| | | |
|---|---|---|
| FR | 884370 | 11/1943 |

* cited by examiner

SERIES WIRED LIGHT STRING WITH UNIDIRECTIONAL SHUNTS

CROSS-REFERENCE TO RELATED APPLICATIONS

This application claims priority to U.S. provisional application Ser. No. 60/832,622, filed on Jul. 21, 2006. This application is also a continuation-in-part of application Ser. No. 10/954,225, filed Oct. 1, 2004, now U.S. Pat. No. 7,166,968, which is a continuation-in-part of application of Ser. No. 10/364,525, filed Feb. 12, 2003, now abandoned, which is a continuation of application Ser. No. 10/061,223, filed Feb. 4, 2002, now U.S. Pat. No. 6,580,182, which is a continuation of application Ser. No. 09/526,519, filed Mar. 16, 2000, abandoned, which is a division of application Ser. No. 08/896,278 filed Jul. 7, 1997, now abandoned, which is a continuation of application Ser. No. 08/653,979, filed May 28, 1996, now abandoned, which is a continuation-in-part of application Ser. No. 08/560,472, filed Nov. 17, 1995, now abandoned which, in turn, is a continuation-in-part of application Ser. No. 08/494,725, filed Jun. 26, 1995, now abandoned.

FIELD OF THE INVENTION

The present invention relates to a series connected light string and, more particularly to an AC series connected light string with unidirectional shunts to ensure continuous but dimmed illumination of the light string in the event a bulb becomes inoperable or is missing.

BACKGROUND OF THE INVENTION

One of the most common uses of series-connected light strings, particularly of the so-called "miniature" type, is for decoration and display purposes, particularly during Christmas time and other holidays, and more particularly for the decoration of Christmas trees, inside and outside of commercial, industrial and residential buildings, trees and shrubbery, and the like.

Probably the most popular light set currently available on the market, and in widespread use throughout the world, comprises one or more strings of 50 miniature light bulbs each, with each bulb typically having an operating voltage rating of 2.5 volts, and whose filaments are connected in an electrical series circuit arrangement. If overall strings of more than 50 bulbs are desired, the common practice is to provide a plurality of 50 miniature bulb strings, with the bulbs in each string connected in electrical series, and with the plurality of strings being connected in a parallel circuit arrangement with respect to each other. Other light strings on the market comprise 35 lights in series.

As each bulb of each string is connected in series, when a single bulb fails to illuminate for any reason, the whole string fails to light and it is very frustrating and time consuming to locate and replace a defective bulb or bulbs. Usually many bulbs have to be checked before finding the failed bulb. In fact, in many instances, the frustration and time-consuming efforts are so great as to cause one to completely discard and replace the string with a new string before they are even placed in use. The problem is even more compounded when multiple bulbs simultaneously fail to illuminate for multiple reasons, such as, for example, the existence of one or more faulty light bulbs, one or more unstable socket connections, or when one or more light bulbs physically fall from their respective sockets, and the like.

There are presently available in the market various devices and apparatuses for electrically testing an individual light bulb after it has been physically removed from its socket. An apparatus is also available on the market for testing series-connected Christmas tree light bulbs, and the like, by physically placing an alternating current line voltage sensor in close proximity to the particular light bulb desired to be tested. However, such a device is merely an electromagnetic field strength detection device which may remain in an "on" condition whenever the particular bulb desired to be tested is physically located in close proximity to another light bulb or bulbs on the Christmas tree.

In fact, light bulb manufacturers have also attempted to solve the problem of bad bulb detection by designing each light bulb in the string in a manner whereby the filament in each light bulb is shorted by various mechanisms and means whenever it burns out for any reason, thereby preventing an open circuit condition to be present in the socket of the burned-out bulb. However, in actual practice, it has been found that such short circuiting feature within the bulb does not always operate in the manner intended, resulting in the entire string going out whenever but a single bulb burns out.

U.S. Pat. No. 4,450,382 utilizes a single Zener or "avalanche" type diode which is electrically connected across each series-connected direct-current ("D.C.") lamp bulb used by military vehicles operating on "steady state" —not pulsating—DC, strictly for so-called "burn-out" protection for the remaining bulbs whenever one or more bulbs burns out for some reason. It is stated therein that the use of either a single or a plurality of parallel and like-connected Zener diodes will not protect the lamps against normal failure caused by normal current flows, but-will protect against failures due to excessive current surges associated with the failure of associated lamps.

Various other attempts have heretofore been made to provide various types of shunts in parallel with the filament of each bulb, whereby the string will continue to be illuminated whenever a bulb has burned out, or otherwise provide for an open circuit condition.

Typical of such arrangements are found in U.S. Pat. Nos. Re. 34,717; 1,024,495; 2,072,337; 2,760,120; 3,639,805; 3,912,966; 4,450,382; 4,682,079; 4,727,449; 5,379,214; and 5,006,724, together with Swiss patent 427,021 and French patent 884,370.

Of the foregoing prior art patents, the Fleck '449, Harnden '966, and the Swiss '021 patents appear, at first blush, to probably be the most promising in the prior art in indicating defective bulbs in a string by the use of filament shunt circuits and/or devices of various types which range from polycrystalline materials, to powders, and to metal oxide varistors, and the like, which provide for continued current flow through the string, but at either a higher or a lower level. The reason for this is because of the fact that the voltage drop occurring across each prior art shunt is substantially a different value than the value of the voltage drop across the incandescent bulb during normal operation thereof.

Some of these prior art shunts cause a reduced current flow in the series string because of too high of a voltage drop occurring across the shunt when a bulb becomes inoperable, either due to an open filament, a faulty bulb, a faulty socket, or simply because the bulb is not mounted properly in the socket, or is entirely removed or falls from its respective socket. However, other shunt devices cause the opposite effect due to an undesired increase in current flow. For example, when the voltage dropped across a socket decreases, then a higher voltage is applied to all of the remaining bulbs in the string, which higher voltage results in higher current flow and a decreased life expectancy of the remaining bulbs in the string. Additionally, such higher voltage also results in increased light output from each of the remaining bulbs in the string, which may not be desirable in some instances. However, when the voltage dropped across a socket increases, then a lower voltage is applied to all of the remaining bulbs in the series connected string, which results in lesser current flow and a corresponding decrease in light output from each of the remaining bulbs in the string. Such undesirable effect occurs in most of the prior art attempts, including those which, at first blush, might be considered the most promising techniques, especially the proposed use of a diode in series with a bilateral switch in the Fleck '449 patent, or the proposed use of a metal oxide varistor in the above Harnden '966 patent, or the use of the proposed counter-connected rectifiers in the Swiss '021 patent.

For example, in the arrangement suggested in the above Fleck '449 patent, ten halogen filled bulbs, each having a minimum 12-volt operating rating, are utilized in a series circuit. The existence of a halogen gas in the envelope permits higher value current flow through the filament with the result that much brighter light is obtainable in a very small bulb size. Normally, when ten 12-volt halogen bulbs are connected in a series string, the whole string goes dark whenever a single bulb fails and does not indicate which bulb had failed. To remedy this undesirable effect, Fleck provided a bypass circuit across each halogen filled bulb which comprised a silicon bilateral voltage triggered switch in series with a diode which rectifies the alternating-current ("A.C.") supply voltage and thereby permits current to flow through the bilateral switch only half of the time, i.e., only during each half cycle of the A.C. supply voltage. It is stated in Fleck that when a single bulb burns out, the remaining bulbs will have "diminished" light output because the diode will almost halve the effective voltage due to its blocking flow in one direction and conduction flow only in the opposite direction. Such substantially diminished light output will quite obviously call attention to the failed bulb, as well as avoid the application of a greater voltage, which would decrease the life of the remaining filaments. However, in actual practice, a drastic drop in brightness has been observed, i.e. a drop from approximately 314-lux illumination output to approximately 15-lux illumination output when one bulb "goes out". Additionally, it is stated by the patentee that the foregoing procedure of replacing a burned out bulb involves the interruption of the application of the voltage source in order to allow the switch to open and to resume normal operation after the bulb has been replaced. (See column 2, lines 19-22 therein.) Additionally, as such an arrangement does not permit more that one bulb to be out at the same time, certain additional desirable special effects such as "twinkling", and the like, obviously would not be possible.

In the arrangement suggested in Harnden '966 patent, Harnden proposes to utilize a polycrystalline metal oxide varistor as the shunting device, notwithstanding the fact that it is well known that metal oxide varistors are not designed to handle continuous current flow therethrough. Consequently, they are merely a so-called "one-shot" device for protective purposes, i.e. a transient voltage suppressor that is intended to absorb high frequency or rapid voltage spikes and thereby preventing such voltage spikes from doing damage to associated circuitry. They are designed for use as spike absorbers and are not designed to function as a voltage regulator or as a steady state current dissipation circuit. While metal oxide varistors may appear in some cases similar to back-to-back Zener diodes, they are not interchangeable and function very differently according to their particular use. In fact, the assignee of the Harnden '966 patent (originally General Electric Corporation, then later Harris Semiconductor, Inc.) states in their Application Note 9311: "They (i.e., metal oxide varistors) are exceptional at dissipating transient voltage spikes but they cannot dissipate continuous low level power." In fact, they further state that their metal oxide varistors cannot be used as a voltage regulator as their function is to be used as a nonlinear impedance device. The only similarity that one can draw from metal oxide varistors and back-to-back Zener diodes is that they are both bidirectional; after that, the similarity ends.

In the Swiss '021 patent, Dyre discloses a bilateral shunt device having a breakdown voltage rating that, when exceeded, lowers the resistance thereof to 1 ohm, or less. This low value of resistance results in a substantial increase in the voltage being applied to the remaining bulbs even when only a single bulb is inoperative for any of the reasons previously stated. Thus, when multiple bulbs are inoperative, a still greater voltage is applied to the remaining bulbs, thereby again substantially increasing their illumination, and consequently, substantially shortening their life expectancy.

Even though the teachings of the foregoing prior art have been available for many years to those skilled in the art, none of such teachings, either singly or collectively, have found their way to commercial application. In fact, miniature Christmas tree type lights now rely solely upon a specially designed bulb, which is supposed to short out when becoming inoperative. Obviously, such a scheme is not always effective, particularly when a bulb is removed from its socket or becomes damaged in handling, etc. The extent of the extreme attempts made by others to absolutely keep the bulbs from falling from their sockets, includes the use of a locking groove formed on the inside circumference of the socket mating with a corresponding raised ridge formed on the base of the bulb base unit. While this particular locking technique apparently is very effective to keep bulbs from falling from their respective sockets, the replacement of defective bulbs by the average user is extremely difficult, if not sometimes impossible, without resorting to mechanical gripping devices which can actually destroy the bulb base unit or socket.

In Applicant's U.S. Pat. No. 6,580,182, entitled SERIES CONNECTED LIGHT STRING WITH FILAMENT SHUNTING, which issued as a continuation of application Ser. No. 09/526,519, filed Mar. 16, 2000, now abandoned which is a division of application Ser. No. 08/896,278, filed Jul. 7, 1997, now abandoned which is a continuation of application Ser. No. 08/653,979, filed May 28, 1996, now abandoned which is a continuation-in-part of application Ser. No. 08/560,472, filed Nov. 17, 1995, now abandoned which is a continuation-in-part of application Ser. No. 08/494,725, filed Jun. 26, 1995 now abandoned, all of which disclosures are incorporated herein, there is disclosed and claimed therein various novel embodiments which very effectively solve the prior art failures in various new and improved ways. For example, there is disclosed therein a series string of incandescent light bulbs, each having a silicon type voltage regulating shunting device connected thereacross which has a predetermined voltage regulating value which is greater than the voltage normally applied to said bulbs, and which said shunt becomes fully conductive only when the peak voltage applied thereacross exceeds its said predetermined voltage switching value, which occurs whenever a bulb in the string either becomes inoperable for any reason whatsoever, even by being removed or falling from its respective socket, and which circuit arrangement provides for the continued flow of rated current through all of the remaining bulbs in the string, together with substantially unchanged illumination in light output from any of those remaining operative in the string even though a substantial number of total bulbs in the string are simultaneously inoperative for any combinations of the various reasons heretofore stated. There is disclosed therein various type of shunting devices performing the above desired end result, including back-to-back Zener, or so-called "avalanche" diodes, non-avalanche bilateral silicon switches, and conventional Zener diodes, one-half of which are electrically connected in one current flow direction and the remaining one-half being electrically connected in the opposite current flow direction.

In U.S. Pat. No. 6,084,357, a series of rectifier diodes are connected in an array across lamp sockets to continue current flow in the event of a failure. This patent teaches the use of two arrays connected in parallel in opposite electrical directions to simulate counter-connected Zener diodes. U.S. Pat. No. 6,580,182 teaches the use of two counter-connected (back-to-back) Zener diodes across each lamp socket. Other patents teach the use of a single Zener diode as a shunt in an AC rectified DC circuit.

Applicant's U.S. Pat. Nos. 6,084,357; 6,580,182 & 6,765,313 are incorporated here in their entirety. While the circuits disclosed and claimed in those patents offer a vastly superior series connected light string with filament shunting which avoids much of the disadvantages of the prior art circuits noted above, a further simplified and less expensive circuit would, of course, be desirable.

It is therefore a principal object of the present invention to provide a simple and inexpensive, and yet highly effective, avalanche silicon type voltage regulating shunt, or bypass, for each of a plurality of series connected light bulbs, said shunt having a predetermined conductive switching value which is approximately the same or only slightly greater than the peak voltage applied to said bulbs, and which shunt becomes conductive whenever such predetermined peak voltage is applied thereacross.

It is another object of the present invention to provide a new and improved series-connected light string which has even much greater desirable features than those previously available, and which utilizes a unique voltage regulating shunting circuit which is of very simple and economical construction and is relatively inexpensive to manufacture in mass quantities, thereby keeping the overall cost of the final product at a much lower cost than heretofore possible.

SUMMARY OF THE INVENTION

The present invention achieves the foregoing and other objectives by providing a new and improved series-connected string of light bulbs, operating on AC voltage, each having connected thereacross a voltage regulating shunting circuit which allows unidirectional current flow and regulates the voltage across an empty or otherwise inoperative socket on half of each AC cycle at substantially the same value as that across each of the remaining sockets in the string, thereby ensuring continued but dimmed illumination of the light string. The voltage regulating shunting circuit of the present invention is advantageously capable of being mass produced by using conventional manufacturing techniques, and thus is one that is much more capable of being manufactured at the desired ultimate selling price of approximately one cent for each said shunting circuit, and thereby constituting a novel light string which is low in cost and very reliable.

Other features and advantages of the present invention will become more apparent from the detailed description of exemplary embodiments provided below with reference to the accompanying drawings in which:

DETAILED DESCRIPTION OF THE PREFERRED EMBODIMENT

Figure 1:
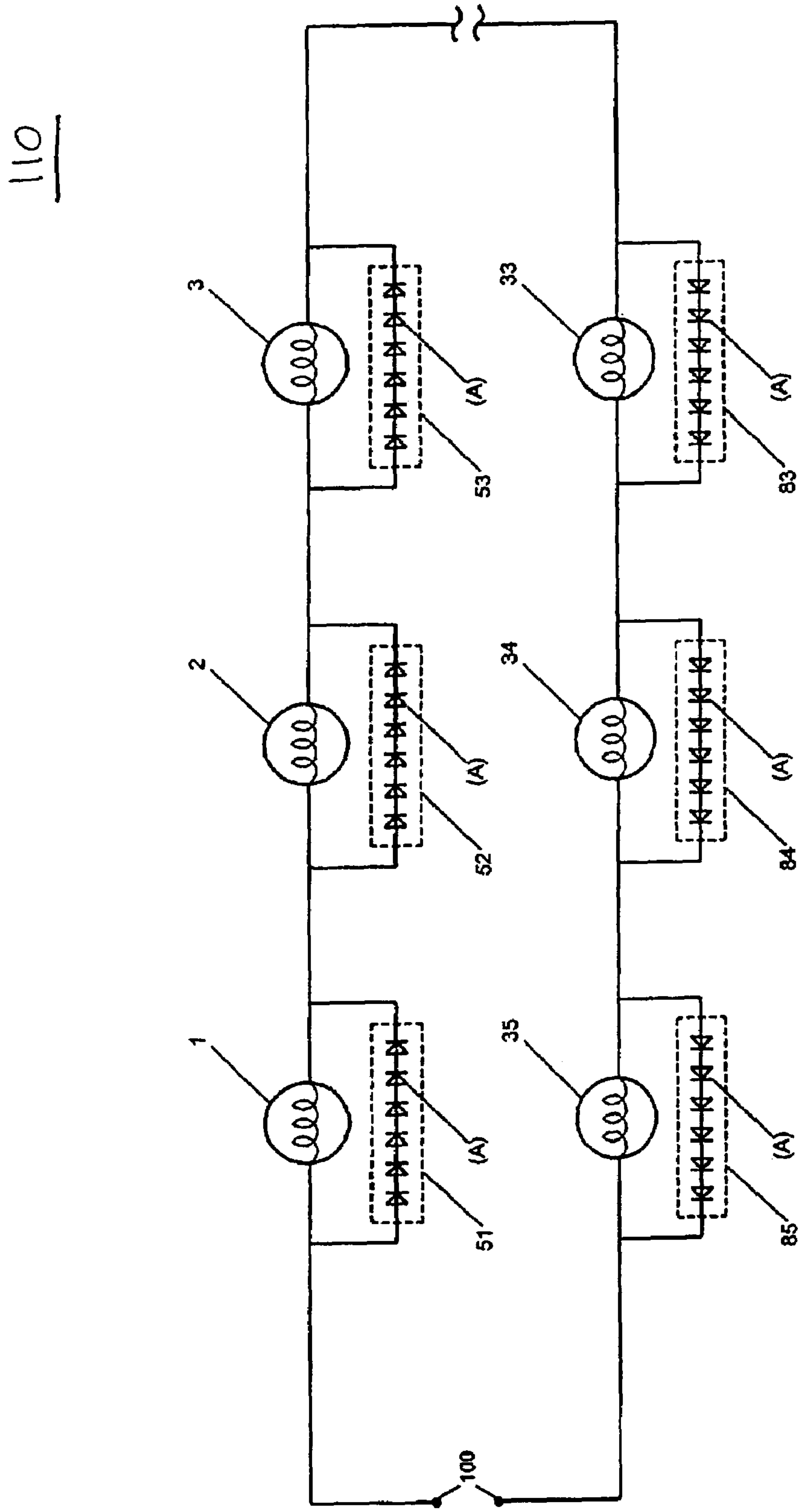
FIG. 1 is an electrical schematic diagram which diagrammatically illustrates the construction of a novel light string in accordance with the teachings of the present invention.

With reference to the schematic diagram in FIG. 1, an illustrative series-circuit light string 110 constructed in accordance with the teachings of the present invention is typically connectable to a source of 110/120 volts of AC operating potential 100 which is normally available in typical households, and commercial and industrial establishments. In series with the 110/120 volt AC operating source 100 are 35 incandescent bulbs 1-35. The series-connected light string is provided with a first socket having a first electrical bulb 1 operatively plugged or otherwise positioned therein. The adjacent terminal of the first socket is electrically and series-connected to the adjacent terminal of the second socket having a second electrical bulb 2 operatively plugged therein, and so on, until each of the 35 electrical bulbs in the entire string are finally operatively connected in an electrical series-circuit arrangement to the AC power supply 100.

Operatively connected in electrical parallel across the electrical terminals of the first socket, hence the electrical terminals of first electric bulb 1, is a first voltage regulating device 51. Likewise, operatively connected in electrical parallel across the electrical terminals of the second socket, hence second electrical bulb 2, is a second voltage regulating device 52, and so on, until each of the remaining sockets, and hence each of remaining electrical bulbs 3 through 35 of the series has a corresponding one of voltage regulating devices 53 through 85 operatively connected in parallel thereacross.

For practical purposes, it is preferred that all of voltage regulating devices 51 through 85 are of identical construction and ideally comprise the electrical functional equivalent of a single silicon Zener diode (in the Zener direction only). Therefore, with an operative electrical bulb missing in the corresponding socket, the peak voltage appearing thereacross is preferably approximately the same or slightly higher than the peak voltage rating of that supplied to the corresponding electrical bulb, when in the socket. Accordingly, when a particular bulb is missing from its socket, the voltage across that particular socket remains substantially unchanged on half of the AC cycle (as explained below) and, accordingly, the voltage across each remaining electrical bulb in the string remains substantially unchanged during half of the AC cycle.

In FIG. 1, the voltage regulating devices 51-85 are constructed of unidirectional rectifier diode arrays. The unidirectional rectifier diode arrays are composed of a plurality of rectifier diodes A connected in series. It is well known that silicon diodes have a forward voltage drop at a specified value of current flowing through them, and ideally the forward voltage drop is the same value from diode to diode, depending upon the quality of the manufacture thereof. In a series-connected light string as used in Christmas and other decorative lighting, a standard so-called "bright" string will draw approximately 130 milliamperes. In the flow of a 130-milliampere current through a 1-ampere, 50-volt, silicon diode A, such as the rectifier 1N4001, the forward voltage drop commonly referred to as the "offset" voltage is approximately 0.7-0.8 volts. By using an adequate number of such silicon diodes A connected in series as shown in FIG. 1, a forward voltage drop of approximately 5.1 volts (peak) is obtained. A 3.5-volt (RMS) bulb placed in a 35 light string operating on rectified AC or half-wave DC voltage (a condition resulting from the use of rectifying diodes, as explained below) has a peak voltage across it of approximately 5.1 volts. Thus, when an electrical bulb 1-35 burns out, falls out or is deliberately taken out of its respective socket, or otherwise becomes inoperative for any reason, the electrically associated voltage regulating shunt 51-85 continues to partially maintain the conduction of current through the remaining series-connected electrical bulbs in the circuit. This is because when the electrical bulb 1-35 is operating normally, there is approximately 5.1 (peak) volts dropped across it. Since the shunt 51-85 has an equivalent operating DC peak voltage drop rating of approximately 5.1 volts, when an electrical bulb 1-35 becomes inoperative for any reason, other than being shorted, there will be no noticeable voltage change across its respective socket. The remainder of the electrical bulbs 1-35 will receive approximately the same voltage as before but only half as frequently (as explained below). As a result, the remaining electrical bulbs remain illuminated but dimmed.

The rectifier diodes A in each voltage regulating device 51-85 act to convert the normal AC voltage to a half-wave pulsating DC voltage. Thus, although the voltage regulating devices 51-85 still allow current to flow through the light string 110 with very little change in the voltage drops across each electric bulb 1-35, the rectifier diode arrays 51-85 limit the frequency of current flow through the string of lights 110. Instead of operating on a normal continuous AC input, the rectifier diodes 51-85 result in a DC current that only operates approximately 50% of the time. As a result of the reduced frequency of current flow through the light string 110, the remaining electrical bulbs 1-35 have a noticeably dimmer output.

Figure 2:
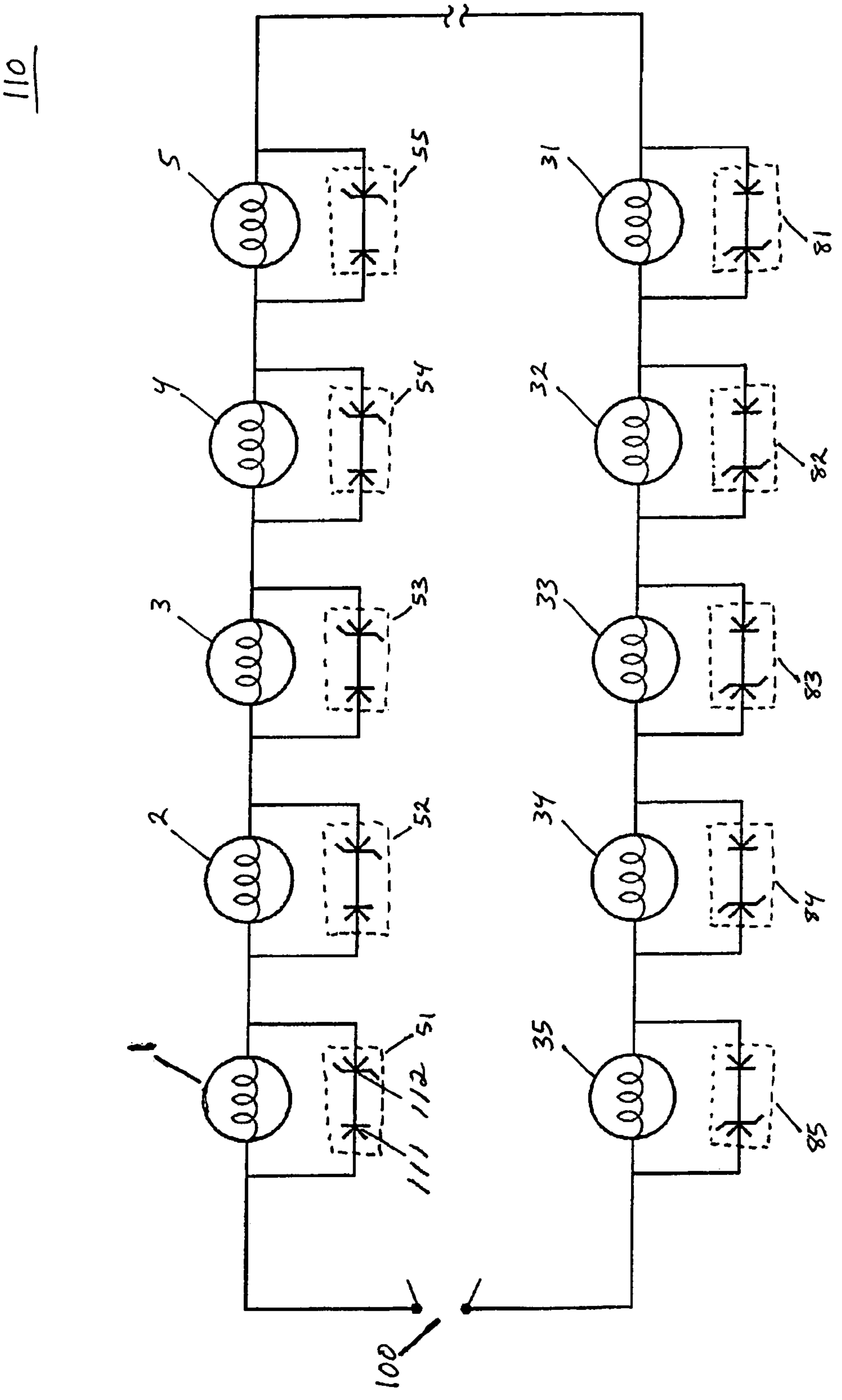
FIG. 2 is an electrical schematic diagram which diagrammatically illustrates an alternative construction of a novel light string in accordance with the teachings of the present invention.

FIG. 2 diagrammatically illustrates an alternative embodiment light string 110. In FIG. 2, the unidirectional shunts 51-85 are not formed by an array of rectifying diodes. Instead, the unidirectional shunts 51-85 are formed by a combination of a silicon rectifier diode 111 in series with a Zener diode 112. The forward direction of the silicon rectifier diode 111 is connected in series with the Zener direction of the Zener diode 112. The Zener diode 112 replaces all but one of the rectifying diodes A of the rectifier diode array of FIG. 1. Such a unidirectional Zener shunt can be fabricated on a single chip or two discrete devices may be used.

An example of a typical light string 110 using such unidirectional shunts consists of 35 mini lights rated at 3.5 volts connected in electrical series. For 120 VAC input, a single Zener diode, used as a shunt device, would typically be rated at a Zener rating of 5.1 volts. Thus, a two device shunt as shown in FIG. 2 could include a silicon rectifier diode and a 4.3 volt Zener diode. The silicon rectifier diode has a forward drop of approximately 0.8 volts. Therefore, the 0.8 volt forward drop of the silicon rectifier diode added to the Zener voltage of 4.3 volts equals 5.1 volts.

Although, in the above example, standard miniature 3.5 (RMS) volt electrical bulbs are used in a light string of 35 bulbs, it will be apparent to those skilled in the art that a different voltage rated bulb and a different number of bulbs in the string can be utilized. Other bulbs having different voltage ratings could be used with equal success and which would merely require a different number of bulbs in the string operating at the same voltage supply which is currently available throughout the country. Of course, the voltage rating of the bulbs will dictate the number of standard 1N4001 silicon diodes, or other rectifier diodes, in the series diode array shunt arrangement.

When the light bulb fails or is removed for any reason, in the above described invention, the remaining bulbs in the string are notably affected by reduced illumination. This is contrary to other light strings having shunts that are designed to continue carrying approximately rated current so that illumination of remaining bulbs are not affected. When all bulbs are operating properly, they are being illuminated by AC (alternating current) from the household supply of the 120 VAC. When a bulb is out or fails for any reason, the household AC supply is rectified and pulsating DC is supplied to the remaining bulbs in the string. This notably affects the brightness of the lights in the string so that it can readily be seen which bulb is out or has failed.

Another consequence of the unidirectional shunts described above is that one or more flasher bulbs may be inserted into the light string in order to achieve a flashing effect from bright to dim to bright. In other words, the presence of one or more flasher bulbs would create a bi-level lighting effect whereby the light string would illuminate between two different brightness levels.

In summary, the advantages of the above-described embodiments include but are not limited to the following. First, operating unidirectional shunts such as those depicted in FIGS. 1 and 2 do not increase the voltage load across any functioning remaining light bulbs in the light string. All remaining bulbs function under normal voltage loads, though not as frequently. Second, because the light output of a light string operating with at least one missing or inoperable bulb is noticeably less than a normal light output, a user can quickly realize that a bulb is out and even identify the problematic bulb for replacement. Third, a problematic bulb may be replaced "live" without turning the light string off or resetting any switches. Fourth, one or more flasher bulbs may be incorporated into the light string so as to create a bi-level flashing effect. Other advantages will be apparent to one skilled in the art.

The above embodiments take advantage of the low cost silicon diodes, which are presently available in the marketplace, together with the low cost light bulbs that are presently being used in large quantities of commercially available light strings that have been in the marketplace for a number of years. While FIG. 1 shows a string of series-connected silicon diodes, it will become readily apparent hereinafter by any person skilled in the art that the actual number of diodes selected can vary, depending upon the type of diode and voltage rating of the bulbs used thereof and the commercial availability thereof, and preferably those of low cost, and the desired end-result to be attained. For example, in the preferred embodiment, the series-connected diodes comprising the voltage regulating devices 51-85 are each of the well-known and readily available low-cost rectifier 1N4001 type silicon diodes and each of the electrical bulbs 1-35 are typical 3.5 volt bulbs. In the case of a 50 light string, 2.5 volt bulbs would be used with corresponding different voltage regulating shunts. In either case, the silicon diodes and electrical bulbs are readily available in the marketplace at low cost.

Although the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A series-wired light string that operates on AC voltage, comprising:

a plurality of light bulbs;

a plurality of light sockets, each light socket adapted to receive at least one light bulb of said plurality of light bulbs; and a plurality of voltage-responsive shunts, each shunt being electrically connected in parallel across a respective light socket to maintain unidirectional current during one-half of an AC cycle in the event that a corresponding light bulb is inoperative or is missing from the light socket, each shunt comprising a silicon rectifier diode connected in series with a voltage regulating diode, wherein the voltage regulating diode is a Zener diode and wherein a forward direction of the silicon rectifier diode is directly connected in series with a Zener direction of the Zener diode.

2. The series-wired light string of claim 1, wherein the voltage regulating diode is an array of silicon diodes connected in series.

3. The series-wired light string of claim 1, wherein each shunt comprises at least two discrete devices.

4. The series-wired light string of claim 1, wherein each shunt is fabricated on a single chip.

5. The series-wired light string of claim 1, wherein each shunt is configured to return the light string to normal operation upon the replacement of a missing or inoperable bulb.

6. The series-wired light string of claim 1, wherein at least one of the plurality of light bulbs is a-flashing bulb that repeatedly flashes on and off.

7. The series-wired light string of claim 6, wherein the light string is dimly lit when the at least one flashing bulb is off, and the light string is brightly lit when all flashing bulbs are on.

* * * * *